3,153,641
PURIFICATION OF SOLID OLEFINIC POLYMERS
Cornelio Caldo, Terni, Italy, assignor to Montecatini Società Generale per l'Industria Mineraria e Chimica, a corporation of Italy
No Drawing. Filed Aug. 3, 1960, Ser. No. 47,160
Claims priority, application Italy Nov. 27, 1957
15 Claims. (Cl. 260—93.7)

This invention relates to an improved process for purifying crude polymerizates of alpha-olefins, $CH_2=CHR$, in which R is hydrocarbon, resulting from the stereospecific polymerization of the monomer to polymerizates consisting prevailingly of high molecular weight, isotactic, crystallizable macromolecules.

In two papers entitled, respectively, "A New Class of Alpha-Olefin Polymers Having Exceptional Uniformity of Structure" and "The Crystalline Structure of a New Type of Polypropylene," which were presented to an open meeting of Accademia Nazionale Dei Lincei on December 11, 1954, and published in the proceedings of the Accademia on January 29, 1955, Natta et al. disclosed new, solid, high molecular weight, linear head-to-tail polymerizates of the alpha-olefins, $CH_2=CHR$, such as propylene, butene-1, etc. Further, Natta et al. showed that polymerizates obtained by them comprised a mixture of sterically differentiated macromolecules which they succeeded in separating by fractional dissolution on the basis of the differences in the steric structure of the macromolecules.

In that way, Natta et al. separated from their crudes (total polymerizates) a fraction or component made up of amorphous atactic macromolecules, a fraction or component made up of stereoblock macromolecules having inseparable isotatic and atactic chain sections, and a fraction or component made up of isotactic macromolecules, i.e., macromolecules having substantially the stereoregular structure which Natta called the "isotactic" structure.

In the case of polypropylene, for example, the crude was extracted successively with boiling acetone (to remove low molecular weight or oily products) ether (to remove the amorphous, atactic elastomeric macromolecules) and n-heptane (which removed the stereoblock macromolecules). The residue of the heptane extraction was shown to be a fraction or component made up of the highly crystallizable isotactic macromolecules as defined by Natta et al., and comprised less than 50% of the total (crude) polymerizate.

The crude polymerizates disclosed in said papers were obtained by polymerizing the alpha-olefin in an inert hydrocarbon solvent and in contact with a catalyst of the so-called "Ziegler" type and consisting of a mixture of unknown precise overall composition resulting from the reduction of a high valency transition metal compound such as $TiCl_4$ with an organometallic compound such as triethyl aluminum.

Subsequently, Natta et al. disclosed that by using certain new stereospecific catalysts developed by them and prepared by (1) starting with solid, highly crystalline, hydrocarbon-insoluble compounds of certain transition metals in which the metal has a valency not higher than 3, such as $TiCl_2$, $TiCl_3$, $ZrCl_3$ and $VCl_3$ and (2) mixing said compounds with selected metal alkyls and alkyl metal compounds which do not destroy the crystalline lattice of the $TiCl_3$ or the like, they could orient the polymerization of the higher alpha-olefin to the preferential production of the crystallizable isotactic macromolecules. They were thus able to obtain crude polymerizates which were made up prevailingly (or over 60%) of the desirable high molecular weight, highly crystallizable isotactic macromolecules.

Crude polymerizates, such as crude polypropylenes, were obtained having such a high content of the crystallizable isotactic macromolecules that the crude (total polymer) could be used as such, without fractionation, for various purposes.

However, the crude polymerizates resulting from the stereospecific polymerization process while being mostly made up of the high molecular weight heptane non-extractable, isotactic crystallizable macromolecules, also generally comprise a certain proportion of very low molecular weight macromolecules, amorphous non-crystallizable macromolecules, and partially crystallizable stereoblock macromolecules.

It is desirable to substantially remove the non-isotactic macromolecules and the very low molecular weight macromolecules, before the polymerizate is used for various purposes, including more especially the production of textile fibers.

The polymerizates further contain inorganic substances resulting from decomposition of the catalyst.

The inorganic substances are impurities which exert a negative influence on the subsequent shaping operations to which the polymers are subjected.

The inorganic substances present in the polymerizates also favor the decomposition of the crystallizable isotactic macromolecules by decreasing the resistance thereof to light and oxygen, and induce discoloration of the polymerizate. In addition, when metal chlorides are present in the polymerizate during processing thereof at high temperatures, the metal chlorides decompose, with evolution of hydrochloric acid, which tends to corrode the apparatus.

So far as high molecular weight, highly crystallizable polymers are concerned, the non-crystallizable amorphous macromolecules, as well as stereoblock macromolecules, and macromolecules of very low molecular weight all exhibit a negative influence on the shaping operations and on the properties of the shaped articles, and must, therefore, also be regarded as impurities which should be separated from the polymerizate before it is used for such purposes as, for instance, the manufacture of textile fibers, especially by melt-extrusion processes.

In fact, the presence in the polymerizate of fractions made up of amorphous, non-crystallizable macromolecules and/or of fractions made up of very low molecular weight macromolecules renders the polymerizate more or less tacky and impedes the extrusion of the polymerizate, more particularly extrusion spinning of the same into filaments. Moreover, the tackiness can persist in the final articles.

In the prior treatments for purifying the polymerizates, and as shown in the Italian Patent No. 526,101, the slurry of the polymerizate in the inert hydrocarbon solvent was quenched with methanol or methanolic HCl to decompose the catalyst, the gases evolved as a result of the decomposition were discharged from the autoclave, and the slurry was removed and filtered to separate the polymerizate from the bulk of the inert solvent and the quenching liquid. The mass remaining on the filter was treated with hot ether and then with HCl in order to remove the inorganic substances remaining in the mass as residues of the catalyst decomposition. The polymerizate, swollen with the treating liquids, was then coagulated with methanol, filtered, washed with methanol, and dried by heating it at a temperature below 100° C. under reduced pressure.

The polymerizate still comprised amorphous, stereoblock, and very low molecular weight macromolecules which were separated from the isotactic macromolecules by subjecting the polymerizate to fractional dissolution with selected organic solvents.

The purification process described in the Italian patent gave satisfactory results but involved at least three successive extractions with three different solvents and at least two intermediate washings, in addition to the steps involved in recovering the solvents.

Polypropylene consisting essentially of isotactic macromolecules and essentially free of inorganic substances can be obtained from the crude polypropylene consisting prevailingly of those macromoleucules but comprising, also, up to 5% of inorganic substances as well as amorphous, stereoblock, and very low molecular weight macromolecules, by extracting the crude successively with acetone, ether and n-heptane, and then treating the residue of the heptane extraction with aqueous acid or aqueous alkaline solution, or with alcohols.

The final product consists essentially of the isotactic macromolecules but, as is evident, the purification of the crude involves a long working cycle using different apparatuses and reagents, decreases the production rate per hour, and considerably increases the cost of the final product.

One object of the present invention is to provide a new and improved method for purifying the crude polymerizates obtained by stereospecific polymerisation of the higher alpha-olefin in accordance with which both the undesired macromolecules, and the catalyst residues, are removed from the crudes simultaneously, in what is, essentially, a single-step purification method.

Another object is to provide a simple and economical method for obtaining, from the crude polypropylene of the stereospecific polymerization process, a polypropylene which consists essentially of high molecular weight, highly crystallizable isotactic macromolecules and is particularly suitable for spinning into textile fibers.

The present invention is described in detail in connection with the purification of a crude polypropylene obtained by polymerizing propylene in an inert hydrocarbon solvent (specifically heptane) and in contact with the Natta et al. stereospecific catalyst consisting essentially of violet crystalline $TiCl_3$ and triethyl aluminum.

The removal of the undesired macromolecules and of the catalyst residues, according to the present method is carried out either after the polymerizate has been quenched, in the slurry thereof in the inert hydrocarbon solvent, with a hydroxylated quenching liquid which may be an alcohol or water, or after the inert hydrocarbon solvent and the quenching liquid have been stripped off by exposing the quenched mass to the action of a current of steam.

As a result of the quenching with the hydroxylated quenching liquid, the inorganic catalyst residues present in the mass are converted into alkoxides or chloroalkoxides and, as result of the quenching and stripping, they are converted into oxides hydrates, hydroxides and/or oxychlorides of the respective metals, in the specific instance, into the hydrates, hydroxides and/or oxychlorides of Ti and Al.

The polypropylene remaining after the stripping comprises, in general, and in addition to the isotactic macromolecules, amorphous, stereoblock, and very low molecular weight crystallizable macromolecules, as well as the oxides hydroxides, hydrates and/or oxychlorides of, e.g., Ti and Al.

In accordance with this invention, both the undesired macromolecules and the alkoxides, chloroalkoxides, oxides, hydroxides, hydrates and/or oxychlorides of the metals of the two catalyst-forming components are removed from the crude polymerizate simultaneously by subjecting the quenched or quenched and stripped polymerizate to a single washing with a chlorinated organic solvent containing a mineral acid, preferably hydrochloric acid.

The present process became possible because of my surprising discovery that the chlorinated hydrocarbon solvents are swelling agents for the highly crystallizable isotactic macromolecules thereby facilitating access of the hydrochloric acid to the converted cataylst residues occluded to those macromolecules, which conversion products are dissolved by the acid, and the further discovery that the chlorinated organic solvents also dissolve amorphous, stereoblock, and very low molecular weight macromolecules present in the polymerize. The single washing with the chlorinated organic solvent containing the mineral acid thus results in the simultaneous dissolution of both the undesired macromolecules and the transformed catalyst residues. It is possible, therefore, to isolate the polypropylene consisting essentially of the high molecular weight, highly crystallizable isotactic macromolecules by filtering the same from the solution of the undesired macromolecules and cataylst conversion products in the mixture of the chlorinated solvent and acid.

The isolated polypropylene can be dried by heating it, preferably under vaclum, and with or without a further treatment with chlorinated solvent or with water to remove any hydrochloric acid adhering to it.

Among the chlorinated organic solvents, the most active and effective for the present purpose are trichlorethylene, chloroform, methylene chloride and carbon tetrachloride.

The washing with the chlorinated solvent containing the mineral acid can be performed in a single step, either continuously or batchwise, at a temperature between room temperature and the boiling point of the solvent, preferably at a temperature close to the boiling point of the solvent. Illustratively, using trichlorethylene containing from 1% to 20% by weight of hydrochloric acid, and a washing solution to polymerizate weight ratio between 2:1 and 50:1, good results were obtained at 80° C. to 90° C., preferably at 80° C. to 85° C.

The washing time required varies depending on the concentration of mineral acid in the chlorinated organic solvent.

Generally, when the chlorinated organic solvent contains 1% to 10% by weight of hydrochloric acid, it is sufficient to reflux the polymerizate with the washing solution for several hours. If the chlorinated solvent is saturated with hydrochloric acid, a shorter washing time is satisfactory.

According to a modification of the invention, the suspension of the quenched or quenched and stripped polymerizate in the chlorinated solvent containing hydrochloric acid is neutralized with gaseous ammonia, and the undissolved polypropylene consisting essentially of isotactic macromolecules is filtered off, and washed with water which may contain a surface active agent. The latter facilitates wetting of the polypropylene and removal of ammonium chloride formed during the neutralization step.

The conditions given can be varied depending on the purity desired for the final product. However, the conditions described are optimum for practical purposes since even when the quenched or quenched and stripped polymerizate contains up to 20-25% of a rubbery fraction or component made up of amorphous (atactic) macromolecules and up to 5% (calculated as ash) of the conversion products of the catalyst components, the final product obtained under the conditions described contains no more than 2% of amorphous polypropylene and/or very low molecular weight marcomolecules, has as ash content in the range of only a few centigrams, and is suitable for spinning into commercially useful textile fibers having excellent characteristics and free of tackiness.

The amount of gaseous hydrochloric acid which can be dissolved in the chlorinated organic solvents mentioned is illustrated by the fact that a saturated chloroform solution at 10° C. contains 1.83 g./l. of HCl, while a saturated carbon tetrachloride solution contains 6.19 g./l. of HCl at 20° C.

The following examples illustrate the present process as applied to the purification of crude polypropylene consisting prevailingly of high molecular weight isotactic macromolecules and resulting from the polymerization of propylene by the stereospecific polymerization method utilizing the catalysts prepared by starting with the solid, highly crystalline, hydrocarbon-in-soluble halides of Ti, V, or Zr, and mixing them with the organometallic compounds of metals belonging to Groups II or III inclusive of the Mendeléeff Periodic Table which do not destroy the crystalline lattice.

It is to be understood that the starting polypropylene described in the examples is one which has been quenched with an alcohol such as methanol or butanol, with water, or with some other hydroxylated solvent that converts the inorganic residues of the catalyst decomposition to the alkoxides or chloroalkoxides, and, after stripping, to the oxides hydrates, hydroxides and/or oxychlorides of the respective metals, which conversion products are insoluble in the chlorinated organic solvents but soluble in a mineral acid such as hydrochloric acid. The amount of alkoxides, chloroalkoxides, oxides hydroxides, hydrates and/or oxychlorides of, e.g., Ti and Al contained in the quenched and stripped starting polypropylene is expressed in terms of the percent ash content of the final polypropylene. The substances described in the examples as being extractable with boiling n-heptane or boiling acetone comprise amorphous macromolecules, partially crystallizable stereoblock macromolecules, and/or very low molecular weight macromolecules.

The starting polypropylenes may have average molecular weights between 170,000 and 620,000 or higher as indicated by specific viscosities of 1.1 to 3.1, determined in tetralin at 135° C. The final polypropylene consisting essentially of high molecular weight isotactic macromolecules has a higher average molecular weight indicated by a higher specific viscosity measured in the same way.

Example 1

100 g. of crude polypropylene, prepared by polymerizing propylene in n-heptane with the stereospecific catalyst prepared from triethyl aluminum and TiCl$_3$, are suspended in 5000 g. carbon tetrachloride, saturated with gaseous hydrochloric acid, in a 10 liter glass flask. This suspension is heated to the boiling point for 2 hours while stirring vigorously. The acid present is then neutralized by bubbling gaseous ammonia through the mass, the undissolved polypropylene is filtered under suction and is then washed with acetone and with water until the reaction of the chlorine ions disappears. It is finally dried under nitrogen.

Characteristics of the final polypropylenes consisting essentially of isotactic macromolecules obtained in two runs as described are contrasted below with the characteristics of the starting crude polypropylenes.

| Polymerizate | [η] | Ash content, percent | Acetone extract, percent | Ether extract, percent | n-Heptane extract, percent |
|---|---|---|---|---|---|
| Starting crude Polypropylene | 1.1 | 0.14 | 9.30 | 8.33 | 10.4 |
| Final purified Polypropylene | 1.49 | 0.015 | 1.97 | 1.34 | 0.36 |
| Staring crude Polypropylene | 3.1 | 0.17 | 2.0 | 5.2 | 9.2 |
| Final purified Polypropylene | 3.33 | 0.015 | 0.41 | 0.73 | 0.3 |

Example 2

The purification treatment of the preceding example is repeated, using 5000 g. of a mixture consisting of 90% carbon tetrachloride 10% of aqueous conc. hydrochloric acid.

The final polypropylenes, washed and dried, showed the following characteristics in contrast to the starting crude polypropylenes.

| Polymerizate | [η] | Ash content, percent | Acetone extract, percent | Ether extract, percent | Heptane extract, percent |
|---|---|---|---|---|---|
| Starting crude Polypropylene | 1.1 | 0.14 | 9.3 | 8.33 | 10.4 |
| Final purified Polypropylene | 1.4 | 0.05 | 1.94 | 0.39 | 0.66 |
| Starting crude Polypropylene | 3.1 | 0.17 | 2.0 | 5.2 | 9.2 |
| Final purified Polypropylene | 3.58 | 0.06 | 1.04 | 0.71 | 0.83 |

Example 3

100 g. of crude polypropylene obtained by polymerizing propylene in n-heptane with the stereospecific catalyst prepared from triethyl aluminum and TiCl$_3$ are suspended in 5000 g. methylene chloride saturated with gaseous hydrochloric acid, in a 10 liter glass flask. The suspension is heated to the boiling temperature for 2 hours while stirring vigorously. The acid present is then neutralized by bubbling gaseous ammonia through the mass; the undissolved polypropylene is filtered under suction and washed with acetone and with water until the reaction of the chlorine ions disappears. It is finally dried under nitrogen. The characteristics of the final polypropylenes obtained in two runs as described are as follows, in contrast to those of the starting crude polypropylenes.

| Polymerizate | [η] | Ash content, percent | Acetone extract, percent | Ether extract, percent | Heptane extract, percent |
|---|---|---|---|---|---|
| Starting crude Polypropylene | 1.1 | 0.14 | 9.3 | 8.33 | 10.4 |
| Final purified Polypropylene | 1.4 | 0.0089 | 0.83 | 0.11 | 0.28 |
| Starting crude Polypropylene | 3.1 | 0.17 | 2.0 | 5.2 | 9.2 |
| Final purified Polypropylene | 3.44 | 0.036 | 0.1 | 1.28 | 0.75 |

Example 4

The purification of crude polypropylenes obtained by the stereospecific polymerization process is carried out as in the preceding example, using 5000 g. of a mixture consisting of 90% methylene chloride and 10% of aqueous conc. hydrochloric acid. The undissolved polypropylenes obtained, after being washed and dried, showed the following characteristics in contrast to the starting crudes.

| Polymerizate | [η] | Ash content, percent | Acetone extract, percent | Ether extract, percent | Heptane extract, percent |
|---|---|---|---|---|---|
| Starting crude Polypropylene | 1.1 | 0.14 | 9.3 | 8.33 | 10.4 |
| Final purified Polypropylene | 1.45 | 0.0244 | 1.54 | 0.138 | 1.22 |
| Starting crude Polypropylene | 3.1 | 0.17 | 2.0 | 5.2 | 9.2 |
| Final purified Polypropylene | 3.58 | 0.011 | 0.59 | 0.81 | 0.74 |

The examples given clearly demonstrate the effectiveness of the present process for purifying crude polypropylenes consisting prevailingly (over 60%) of isotactic crystallizable macromolecules, after quenching of the crudes or after both quenching and stripping of the polymerization solvent therefrom with conversion of the inorganic residues of the catalyst decomposition to the alkoxides, chloroalkoxides, oxides hydrates, hydroxides and/or oxychlorides of the metals of the catalyst-forming components to recover from the crudes, polypropylene essentially free of catalyst residues and of non-isotactic macromolecules and very low molecular weight macromolecules. Variations can be made. For instance, the process is equally effective for the purification of other crude higher alpha-olefin polymerizates, such as polybutene-1 and polystyrene, consisting prevailingly of high molecular weight isotactic macromolecules and obtained by polymerizing the particular monomer under a low pressure, in an inert hydrocarbon solvent, and in contact with the catalysts prepared by starting with the solid, crystalline, hydrocarbon-insoluble halides of Ti, V or Zr, as described.

Instead of hydrochloric acid, other mineral acids, such as sulfuric acid, may be mixed with the chlorinated organic solvents and carried thereby into the quenched or quenched and stripped polymerizate to dissolve the catalyst residues present therein in the form of the alkoxides, chloroalkoxides, oxides hydroxides, hydrates and/or oxychlorides that are soluble in the mineral acids. Nitric acid is also useful, and good results were obtained by washing crude polypropylene as described in the examples, with a mixture of 95 parts by weight of trichloroethylene and 5 parts of nitric acid having a density of 1.4.

The foregoing variations and other modifications which may be apparent to those skilled in the art from the description and examples given are intended to be included in the scope of the appended claims.

This application is a continuation-in-part of applicant's co-pending application Serial No. 775,725, filed on November 24, 1958, now abandoned, which in turn claims priority of Italian patent application.

What is claimed is:

1. In the process of purifying crude polymerizates obtained by polymerizing an alpha-olefin characterized by the formula $CH_2=CHR$ wherein R is a hydrocarbon, in an inert-hydrocarbon solvent and in the presence of a stereospecific catalyst consisting essentially of (A) a solid, highly-crystalline, hydrocarbon-insoluble chloride of a transition metal selected from the group consisting of titanium, vanadium and zirconium wherein the metal has a valence not exceeding three and (B) an organo-metallic compound of a metal belonging to Groups II and III of the Periodic Table which do not destroy the crystalline lattice of the transition metal compound; the improvement which comprises (C) quenching the polymerizate in a slurry of the inert solvent with a hydroxyl-containing quenching liquid to convert the inorganic-containing catalyst residues into mineral acid-soluble compounds and (D) washing the quenched polymerizate with a chlorinated-hydrocarbon solvent having 1 to 2 carbon atoms and more chlorine atoms than carbon atoms per molecule which contains from about 1% to 20% by weight of the chlorinated solvent of a mineral acid selected from the group consisting of hydrochloric, sulfuric and nitric acids; said washing taking place at a temperature ranging from about room-temperature to the boiling point of the chlorinated solvent and for a period sufficient to dissolve the inorganic-containing residues and the chlorinated-hydrocarbon soluble portions of the polymerizate, thereby leaving an insoluble portion of purified polymerizate consisting essentially of high molecular weight isotactic macromolecules.

2. The process of claim 1 further characterized in that the hydroxyl-containing quenching liquid and the inert-hydrocarbon solvent are removed from the polymerizate with steam prior to washing the polymerizate with the chlorinated hydrocarbon containing the mineral acid.

3. The process of claim 1 further characterized in that the organo-metallic compound is an aluminum trialkyl.

4. The process of claim 1 further characterized in that the organo-metallic compound is a dialkyl aluminum monohalide.

5. The process of claim 1 further characterized in that the polymerizate is polypropylene obtained by polymerizing the monomer in the inert-hydrocarbon solvent and in the presence of a stereospecific catalyst consisting essentially of (A) a violet crystalline $TiCl_3$ and (B) triethyl aluminum.

6. The process of claim 1 further characterized in that the hydroxyl-containing quenching liquid is an alcohol.

7. The process of claim 1 further characterized in that the mineral acid is hydrochloric acid and the chlorinated-hydrocarbon solvent is methylene chloride.

8. The process of claim 1 further characterized in that the chlorinated-hydrocarbon solvent is trichloroethylene.

9. The process of claim 1 further characterized in that the chlorinated-hydrocarbon solvent is chloroform.

10. The process of claim 1 further characterized in that the chlorinated-hydrocarbon solvent is carbon tetrachloride.

11. The process of claim 1 further characterized in that the acid is sulfuric acid.

12. The process of claim 1 further characterized in that the acid is nitric acid.

13. The process of claim 1 further characterized in that the chlorinated-hydrocarbon solvent is trichloroethylene and the acid is hydrochloric acid.

14. The process of claim 1 further characterized in that the chlorinated-hydrocarbon solvent is carbon tetrachloride and the acid is hydrochloric acid.

15. The process of claim 1 further characterized in that the chlorinated-hydrocarbon solvent is chloroform and the acid is hydrochloric acid.

References Cited in the file of this patent

UNITED STATES PATENTS

| 2,838,477 | Roelen et al. | June 10, 1958 |
| 2,845,414 | Schutze | July 29, 1958 |

FOREIGN PATENTS

| 526,101 | Italy | May 14, 1955 |